United States Patent [19]

Cole

[11] Patent Number: 5,490,478

[45] Date of Patent: Feb. 13, 1996

[54] ANIMAL HAMMOCK

[76] Inventor: Teddi A. Cole, 10613 Lakeside Oaks Ct., Burke, Va. 22015

[21] Appl. No.: 324,753

[22] Filed: Oct. 4, 1994

[51] Int. Cl.$^6$ ................................................ A01K 29/00
[52] U.S. Cl. ............................................................ 119/28.5
[58] Field of Search ..................... 119/15, 19, 28.5; 383/24, 13, 4; 5/9.1, 120, 122, 124, 127

[56] References Cited

U.S. PATENT DOCUMENTS

| | | | |
|---|---|---|---|
| 68,927 | 9/1867 | Woods | 5/122 |
| 136,059 | 2/1873 | Hohorst | 119/725 |
| 276,234 | 1/1883 | Fichtner | 5/122 |
| 1,015,239 | 1/1912 | Miller | 119/725 |
| 2,626,648 | 1/1953 | Anderson | 383/4 |
| 2,789,610 | 4/1957 | Pritchard | 383/24 X |
| 3,364,511 | 1/1968 | Martin | 383/24 X |
| 4,010,880 | 3/1977 | Guillot-Munoz | 119/28.5 |
| 4,088,167 | 5/1978 | Schwartz | 383/13 X |
| 4,521,045 | 6/1985 | Hart | 383/24 X |
| 4,644,902 | 2/1987 | Doyle | 119/725 |
| 4,680,808 | 7/1987 | Paleschuck | 383/24 X |
| 4,907,633 | 3/1990 | Eckstein | 383/13 X |
| 5,010,843 | 4/1991 | Henry | 119/28.5 |
| 5,097,545 | 3/1992 | Hooi | 5/122 |
| 5,230,304 | 7/1993 | Santoro | 119/19 X |

*Primary Examiner*—Thomas Price
*Attorney, Agent, or Firm*—Donald W. Marks

[57] ABSTRACT

An animal hammock includes a rectangular cloth body 20 folded at a transverse midline 22 to form halves 24 and 26. Diagonal gussets 28 and 30 are stitched at the corners extending from the open sides to the fold axis 22 to form a pocket 32 into which a small animal can crawl and hide or rest. Snap rings 70 and 72 threaded through hems 54 and 56 fasten the hammock to a support.

6 Claims, 3 Drawing Sheets

5,490,478

ANIMAL HAMMOCK

TECHNICAL FIELD

The present invention relates to hammocks, cradles, slings, and the like suitable for use by small animals such as squirrels, ferrets, possums, chipmunks, cats, hampsters, and other animals which tend to crawl and hide in small closed places for shelter, rest and comfort.

BACKGROUND ART

Injured small wild animals like squirrels, possums, chipmunks, etc., are treated, housed and fed by rehabilitators until the animals are healthy enough to be released. In the wild, these animals normally have nests in small closed places into which they can crawl and hide for shelter, rest and comfort. Additionally some domestic animals or pets, such as ferrets, cats, hampsters, etc. often crawl into relatively closed places to hide and rest or sleep.

Beds are often provided for small domestic animals or small wild animals in cages. These beds typically include an open-top box or pan containing a blanket, mattress or other pad upon which the animal can lie. U.S. Pat. No. 5,010,843 discloses a bed having overlying cushions forming a trough or pockets into which small animals may crawl.

A spring supported, hammock type infant cradle is disclosed in U.S. Pat. No. 5,097,545.

SUMMARY OF INVENTION

The present invention is summarized in an animal hammock formed from an elongated rectangular cloth body folded in half about a bottom transverse axis to form upper extending ends. Gussets are formed at the sides on the folded corners at the fold axis by diagonal lines of stitches to form a pocket at the folded bottom of the body. The folded cloth body is hung from a support by securing the upper extending ends of the body to the support.

It is an object of the invention to provide a nest-like device in which small animals can crawl to hide and rest and remain warm.

Another object of the invention is to provide a nest-like device from a rectangular cloth folded in half at a bottom axis to form a hammock which is hung by the upward extending ends of the folded cloth and which has bottom corner gussets defining a transverse pocket.

One advantage of the invention is that an animal hammock is simply formed from relatively inexpensive cloth materials which are stitched and folded.

Additional features of the invention include open horizontal hems formed on the upper extending ends of the folded cloth hammock with members threaded through the hems to hang the hammock from a support; snap rings comprising the members threaded through the hems for being easily opened and closed to secure the hammock on the support; and a cloth body formed from a pair of cloth sheets with padding sandwiched between the sheets for warmth and comfort.

Other objects, advantages and features of the invention will be apparent from the following description of the preferred embodiments and the accompanying drawings.

DESCRIPTION OF THE PREFERRED EMBODIMENT(S)

Figure 1:
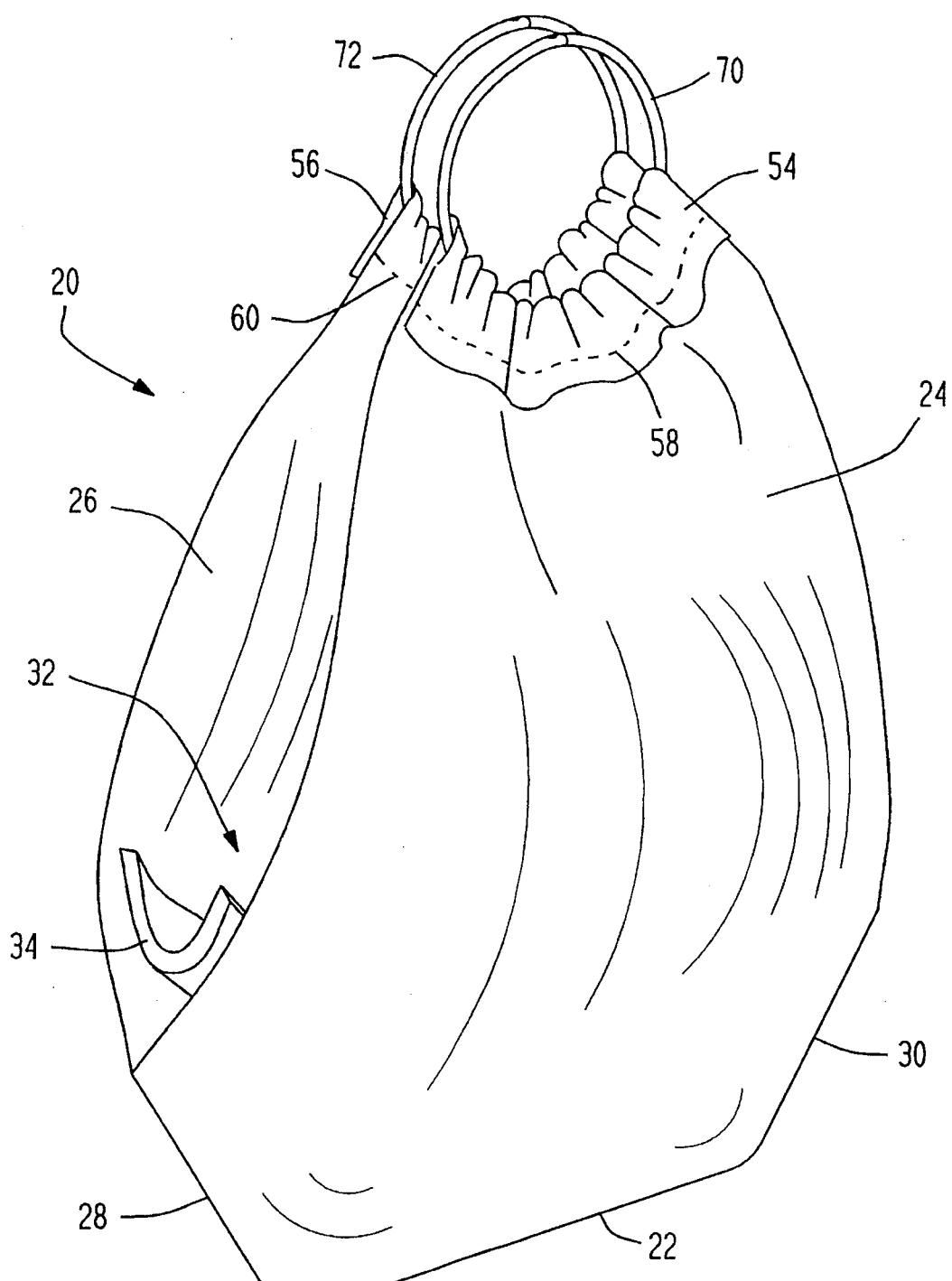
FIG. 1 is a perspective view of one embodiment of an animal hammock in accordance with the present invention.
Figure 2:
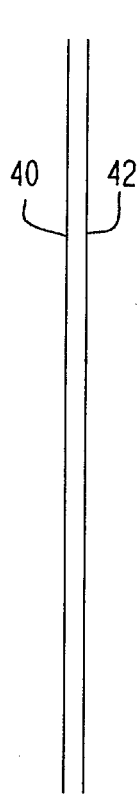
FIG. 2 is a side view of a pair of rectangular cloths used in forming the body of the hammock of FIG. 1.

As shown in FIG. 1, an animal hammock constructed in accordance with one embodiment of the invention includes a vertically elongated rectangular cloth body indicated generally at 20 folded at a transverse bottom midline 22 to form upward extending halves 24 and 26 which can be hung at their upper ends on a support 27. Diagonal gussets 28 and 30 are stitched at the bottom corners to form a pocket, indicated generally at 32. Above the gussets 28 and 30, the sides are open as indicated generally at 33 to permit a small animal to crawl into the pocket 52 to hide or rest. A rectangular piece 34 of synthetic lambs wool can be optionally placed in the pocket as a soft bottom liner for the pocket.

Figure 3:
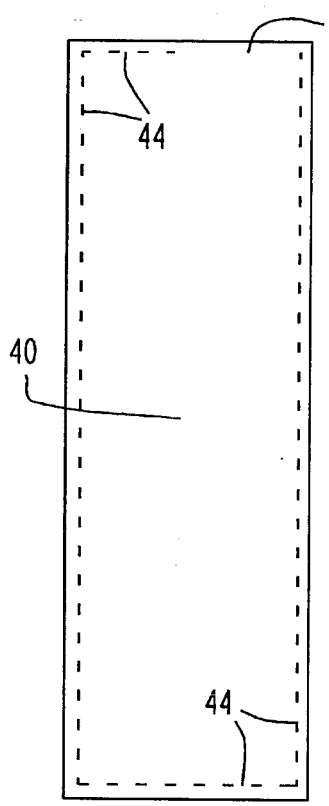
FIG. 3 is a front view of the rectangular cloths of FIG. 2 showing an initial stitching.
Figure 4:
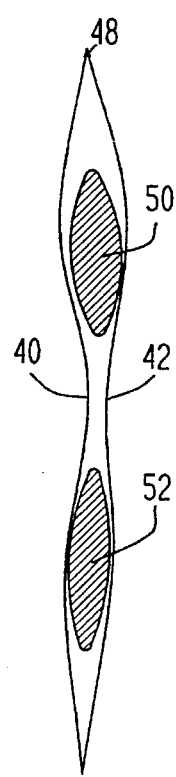
FIG. 4 is a sectional side view of the cloths of FIG. 3 after being turned inside out and stuffed with fill.
Figure 5:
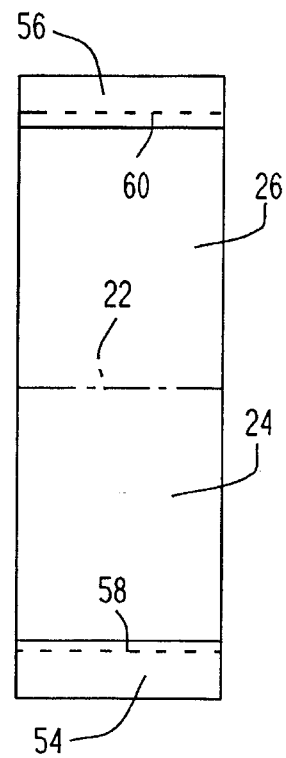
FIG. 5 is a front view of the stuffed cloths of FIG. 4 showing the folding and stitching used to form hems at the opposite ends.
Figure 6:
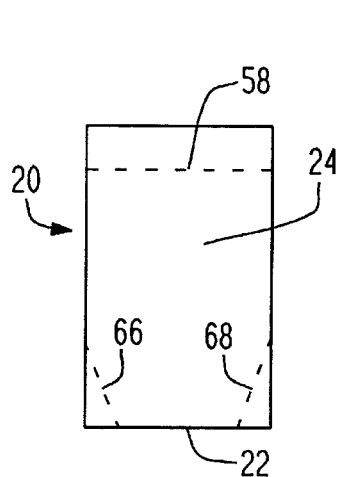
FIG. 6 is view similar to FIG. 5 but after the bottom half of the hemmed cloths has been folded up in front of the top half and diagonal gusset stitching is formed on the bottom corners.
Figure 7:
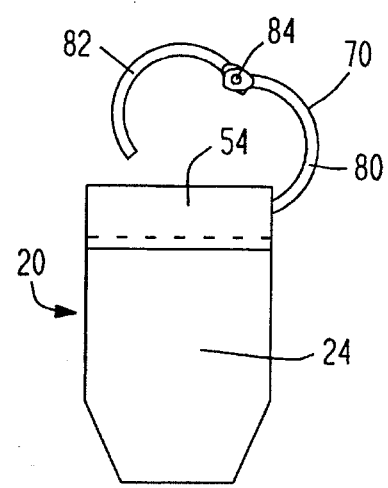
FIG. 7 is a view similar to FIG. 6 but after the gussetted cloth body of FIG. 6 has been turned inside out.

In one embodiment the folded cloth body 20 is formed as illustrated in FIGS. 2–7. A pair of vertically elongated rectangular cloth sheets 40 and 42 placed face to face, FIGS. 2 and 3. The cloth sheets are sewn together at their edges by a line of stitching 44 formed around the periphery leaving an opening 46 suitable for insertion of a hand. The assembled cloth sheets of FIG. 3 are then turned inside out through the opening 46 and padding such as polyester fill 50 and 52 is placed inside in the upper and lower halves as shown in FIG. 4. After insertion of the padding, loose edges are tucked in and the opening 46 is closed by a line of stitches 48. Then the lower and upper ends 54 and 56 of the filled body are folded about horizontal axes, as shown in FIG. 5, and secured by respective horizontal lines of stitches 58 and 60 to form hems which are open on the opposite sides. Subsequently the hemmed body is folded in half about the midline 22 by the bottom half 24 being folded upward over the top half 26. Diagonal lines of stitches 66 and 68 are made across the bottom corners of the folded halves to extend from the side edges downward to the bottom axis 22 to form the gussets 28 and 30 of FIG. 1. Above the gussets 28 and 30, the side edges of the folded halves remain unstitched or open. Turning the stitched body of FIG. 6 inside out completes the formation of the body 20 as shown in FIG. 7.

Figure 8:
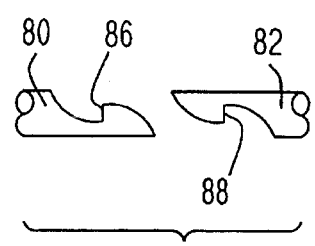
FIG. 8 is a top view of broken away portions of the interlocking closure structure of snap rings used to hang the hammock body on a support.

Suitable fastener members 70 and 72, FIGS. 1 and 7, are threaded through the respective open hems 54 and 56 and used to secure the upper ends of the halves 24 and 26 on a support 27, such as a bar of a cage or other support member. Preferably the fastener members 70 and 72 are metal snap rings which have semicircle halves 80 and 82 hinged at 84, FIG. 7. Free ends of the snap ring halves 80 and 82, as shown in FIG. 8, are formed with mating interlocking portions or hooks 86 and 88 to secure the snap ring into a closed circle. Alternatively, strings, such as shoe strings, or other types of suitable fastener members can be employed to secure the hammock body on a support.

Figures 9, 10:
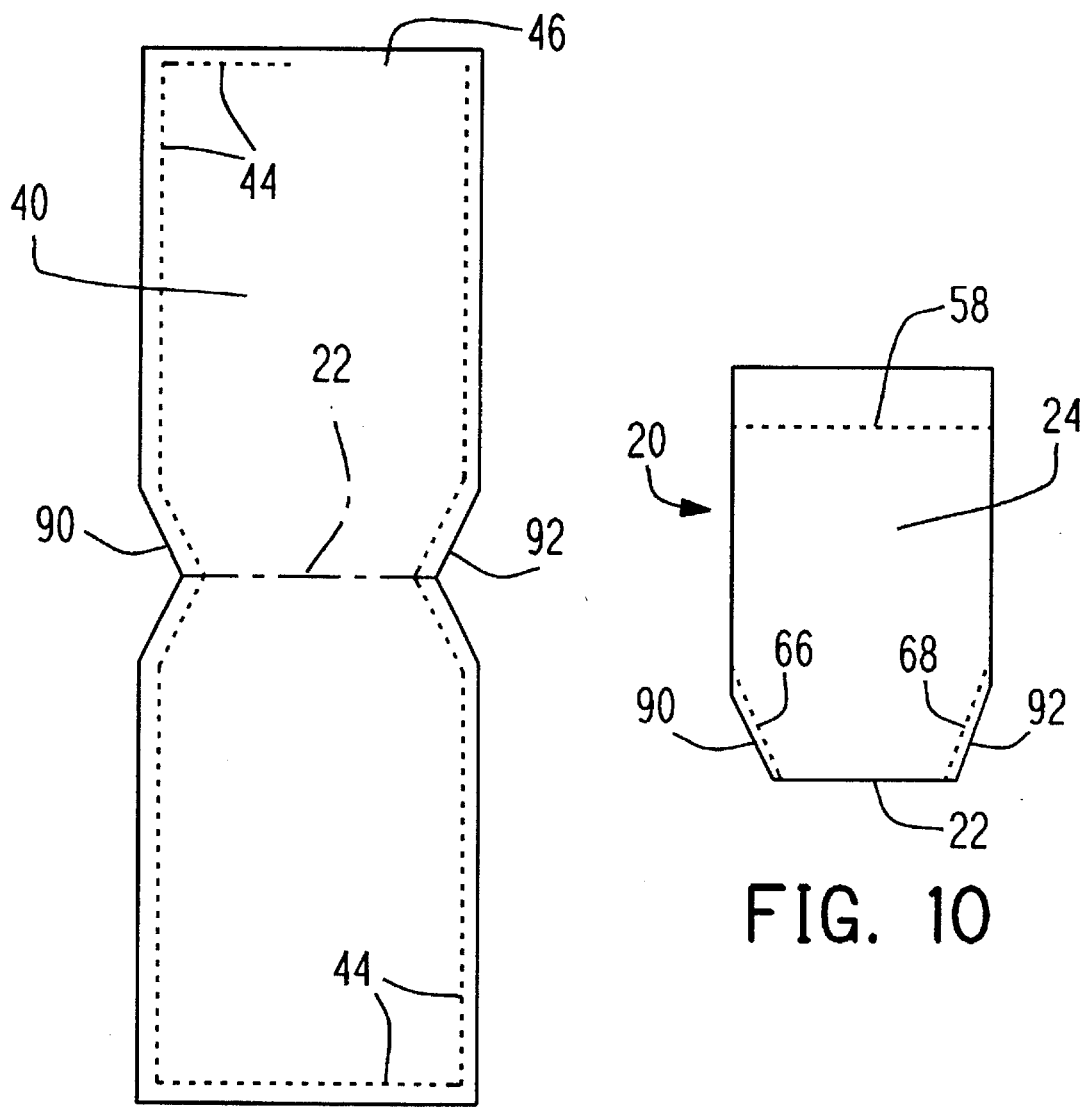
FIG. 9 is a front view similar to FIG. 3 but of a modified pair of rectangular cloths.
FIG. 10 is a view similar to FIG. 6 but showing the modified body formed from the sheets of FIG. 9 with gusset stitching.

In a variation of the hammock as shown in FIGS. 9 and 10, the cloth sheets forming the body of the hammock are initially cut with triangular cutouts 90 and 92 on opposite sides of the cloth sheets at the ends of the midline 22. These cutouts 90 and 92 reduce the cloth material in the corners formed by the gusset stitching 66 and 68 and which extends in the pocket 32 of the hammock.

Small animals can readily crawl into the pocket 32 formed between the upward extending halves 24 and 26 of the cloth body of the hammock. When the upper ends of the hammock are secured close together the pocket is generally closed at the top so that the pocket provides a hidden nest for the animal to rest or sleep. The padded halves also reduce loss of body heat so that the animal remains warm during cool or cold conditions.

The hammock body can be made with many variations or modifications. For example, the above described embodiments are formed from two cloth sheets having upper and lower halves filled with padding. However a single cloth sheet or padded quilted sheets can be formed with suitable hems and gusset stitching to form the body of the hammock.

Since many variations, modifications and changes in detail can be made in the above described embodiments of the animal hammock, it is intended that all matter in the foregoing description and accompanying drawings be interpreted as illustrative of the described examples and not as limiting on the scope and spirit of the invention as defined in the following claims.

What is claimed is:

1. An animal hammock comprising a vertically elongated rectangular cloth body folded about a lower horizontal axis to form upper extending ends;

a pair gussets formed on respective opposite bottom corners at the lower horizontal axis by lines of stitches extending diagonally downward and inward from side edges of the folded body to the lower horizontal axis;

the side edges of the folded body above the gussets being open to permit animal access; and means secured to the upper ends for hanging the body from a support.

2. An animal hammock as claimed in claim 1 wherein the means for hanging the body from a support includes horizontal hems formed of the respective upper extending ends of the body by the upper extending ends being folded about respective upper horizontal axes and stitched by horizontal lines of stitches leaving the hems open at opposite ends; and a pair of members threaded through the respective hems for hanging the body from a support.

3. An animal hammock as claimed in claim 2 wherein the pair of members threaded through the respective hems comprise circular snap rings.

4. An animal hammock as claimed in claim 1 wherein the cloth body is formed from a pair of rectangular cloth sheets with padding sandwiched between the cloth sheets.

5. An animal hammock as claimed in claim 4 wherein the padding is polyester fill and the cloth sheets are stitched together around a periphery of the sheets.

6. An animal hammock comprising a vertically elongated rectangular cloth body folded about a lower horizontal axis to form upper extending ends;

said cloth body being formed from a pair of rectangular cloth sheets stitched together around a periphery thereof with polyester fill padding sandwiched between the cloth sheets;

a pair gussets formed on respective opposite bottom corners at the lower horizontal axis by lines of stitches extending diagonally downward and inward from side edges of the folded body to the lower horizontal axis;

the pair of rectangular cloth sheets having triangular cutouts on opposite sides at ends of the lower horizontal axis to reduce cloth material at the gussets, and means secured to the upper extending ends for hanging the body from a support.

\* \* \* \* \*